United States Patent
Reichelt

(10) Patent No.: US 6,254,922 B1
(45) Date of Patent: Jul. 3, 2001

(54) COMPOSITION AND METHOD FOR COATING RADIATION SURFACES

(76) Inventor: Helmut Reichelt, Altenzeller Strasse 13A, Dresden (DE), 01069

( * ) Notice: Subject to any disclaimer, the term of this patent is extended or adjusted under 35 U.S.C. 154(b) by 0 days.

(21) Appl. No.: 09/381,146

(22) PCT Filed: Apr. 21, 1998

(86) PCT No.: PCT/EP98/02329

§ 371 Date: Nov. 12, 1999

§ 102(e) Date: Nov. 12, 1999

(87) PCT Pub. No.: WO98/49242

PCT Pub. Date: Nov. 5, 1998

(30) Foreign Application Priority Data

Apr. 28, 1997 (DE) .............................................. 197 17 682

(51) Int. Cl.[7] ........................................................ B05D 5/12
(52) U.S. Cl. ............................ 427/58; 427/356; 427/421; 427/429; 106/157.2; 106/159.1; 106/472
(58) Field of Search ............................... 427/58, 356, 358, 427/421, 429; 106/157.2, 159.1, 472

(56) References Cited

U.S. PATENT DOCUMENTS

| 4,186,294 | | 1/1980 | Bender . |
|---|---|---|---|
| 5,004,561 | * | 4/1991 | Nomura et al. . |
| 5,057,370 | * | 10/1991 | Krieg et al. . |
| 5,223,327 | * | 6/1993 | Bihy et al. . |
| 6,001,204 | * | 12/1999 | Halg et al. . |

FOREIGN PATENT DOCUMENTS

| 197 14 299 | * | 10/1998 | (DE) . |
|---|---|---|---|
| 0262630 | | 4/1988 | (EP) . |
| 0525808 | | 2/1993 | (EP) . |
| 8-034923 | | 2/1996 | (JP) . |

\* cited by examiner

*Primary Examiner*—Fred J. Parker
(74) *Attorney, Agent, or Firm*—Flint & Kim, P.A.

(57) ABSTRACT

A coating material and method of manufacture for radiation surfaces which produce electromagnetic waves is disclosed. The coating material consists of 55 to 65% mole fraction of a base material and 35 to 45% mole fraction of graphite. The base material contains a binding agent, insulating agent, dispersing agent, and distilled water mixed together. The binding agent is comprised of distilled water, sulfated oil, phenolene or benzoisothiazolinon, casein, urea, alkali diluent and caprolactam. The method for producing the coating material includes the steps of creating the binding agent, mixing the binding agent with the other base components, and finally, mixing in the graphite. The result is a coating material with a plurality of dipoles that produces a high degree of radiation of electromagnetic waves when in a state of excitation.

11 Claims, No Drawings

COMPOSITION AND METHOD FOR COATING RADIATION SURFACES

FIELD OF THE INVENTION

The invention relates to a coating material for radiation surfaces to produce electromagnetic waves and a method for manufacturing the coating material.

BACKGROUND OF THE INVENTION

Coating materials of this type are applied to the radiation surfaces of emitters used in energy technologies, in particular refrigeration technology and temperature-control technology. The electromagnetic waves generated through the interaction of the emitter with the coating material to cool down or heat a material placed in the emission field of the emitter.

Heretofore, a coating material for radiation surfaces to produce electromagnetic waves and a method for manufacturing the coating is already known; as disclosed in DD-208 029. The coating material is a mixture consisting of binding agent, insulating agent, dispersing agent, water and graphite. A polyvinyl acetate and/or a polyacrylate and/or a polypeptide is used as binding agent, while an insulating soot is used as insulating agent. Graphite, soot and binding agent form electric dipoles in the coating material which emit electromagnetic waves in the excited state. The process for the preparation of this coating material encompasses essentially two steps: the mixing of these substances by means of a stirring apparatus, and the application of pressure to reduce the size of the soot and graphite particles.

Only general statements as to the basic composition of a coating material are however made therein, from which no specific composition of the coating material with good effectiveness with regard to the emission of electromagnetic waves, can be derived.

It is therefore an object of the present invention to provide a coating material of a specific composition and a method of manufacture which produces an effective emission of electromagnetic waves.

SUMMARY OF THE INVENTION

The above objectives are accomplished according to the present invention by providing a coating material consists of 55% to 65% mole fraction of a base material and 35% to 45% mole fraction graphite. The base material contains a mixture of 39% to 49% mole fraction binding agent, 18% to 23% mole fraction insulating agent, 18% to 24% mole fraction dispersing agent, and 12% to 16% mole fraction distilled water. The binding agent is comprised of 64% to 79% mole fraction distilled water, 4% to 6% mole fraction sulfated oil, 0.16% to 0.24% mole fraction or 0.05% to 0.5% mole fraction benzoisothiazolinon, 15% to 19% mole fraction casein, 0.8% to 1.2% mole fraction urea, 2% to 3% mole fraction alkali diluent and 2.5% to 3.5% mole fraction caprolactam. Preparing the coating material includes a first step of mixing together the components of the binding agent. In a second step, the binding agent is mixed with the insulating agent, dispersing agent, and distilled water to form the base material. In a third step, graphite is mixed with the base material. The result is a coating material with a specific composition that has an effective emission of electromagnetic waves when in a state of excitation.

DETAILED DESCRIPTION OF THE INVENTION

The binding agent is composed of:
64 to 79% mole fraction distilled water,
4 to 6% mole fraction sulfated oil,
0.16 to 0.24% mole fraction phenols or 0.05 to 0.5% mole fraction benzoisothiazolinon,
15 to 19% mole fraction casein,
0.8 to 1.2% mole fraction urea,
2 to 3% mole fraction alkali diluent and
2.5 to 3.5% mole fraction caprolactam The coating material itself is composed of 55 to 65% mole fraction of a base material (base substance) and 35 to 45% mole fraction graphite, where the base material consists of a mixture of 39 to 49% mole fraction binding agent, 18 to 23% mole fraction insulating agent, 18 to 24% mole fraction dispersing agent and 12 to 16% mole fraction distilled water. In this composition the coating material builds up a large number of evenly distributed, microscopic electric dipoles formed from the insulating agent, the graphite and the binding agent.

The binding agent contains distilled water as the main component to ensure, dependent on the quantity added, an at least viscous consistency of the binding agent. In this way the individual components of the binding material can be mixed together well.

The sulfated oil, and a flow-control agent if present, act as a solvent intermediary and bring about a uniform and stable distribution of the individual substances in the binding agent as well as good film formation of the coating material on the substrate.

The phenols or benzoisothiazolinon contained in the binding agent, even in small quantities, promote the addition of particles.

Casein can be regarded as the binding agent in the binding agent and enables the individual components to be taken up within the binding agent.

Urea is also used as a solvent intermediary in the binding agent i.e. it promotes an even distribution of the individual components in the binding agent.

The binding agent also contains a diluent functioning as an homogenizers as well as, caprolactam as a structural component. The main component of the base material is the binding agent in which the particles of the insulating agent, as one part of the electric dipole, accumulate. The dispersing agent aids the dispersion process and thereby an even distribution of the binding agent, including the insulator particles, within the base material. The distilled water mixed into the base material serves to liquefy the base material.

The graphite and its individual particles added during mixing of the coating material also deposit themselves in the binding agent, to which the insulator is already bound, and in conjunction with the insulating agent form a large number of microscopic electric dipoles, evenly distributed within the coating material. The graphite can be added in a milled state with very small particle size. This further promotes an even distribution of the graphite in the coating material and therefore the creation of a large number of electric dipoles. A high degree of radiation with regard to the generation and emission of electromagnetic radiation can thereby be achieved with this coating material. An emitting surface coated with a coating material of this type when subjected to a high frequency stimulus emits electromagnetic radiation of a correspondingly high frequency. After preparation, the coating material should preferably have a minimally viscous, spreadable consistency and will dry after the radiation surface has been coated, whereby the surface should preferably be continuous and free of tears.

The sulfated oil can be one of several sulfated oils such as sulfated olive oil, sulfated sesame oil or sulfated palm oil. In the preferred embodiment, the sulfonated oil of preference is, however, sulfated ricinus oil, commonly known as sulforicinate or Turkey red oil. This sulfated ricinus oil is especially well suited on account of its interface-active properties.

The phenols of preference are carbonized phenols, produced by cracking, which demonstrate particular suitability with respect to the addition of particles. The preferred alternative to phenols is benzoisothiazolinon.

The diluent is a solvent based on aromatics and/or alcohol and/or ester and/or ketone, e.g. terpene.

A large variety of common insulators can be used as insulating agent. In the preferred embodiment, the insulating agent of preference is, however, an insulating soot. It is advantageous if the soot is added in the milled state with a very small particle size. This promotes and even distribution of the soot in the base material and therefore the overall formation of a multitude of electric dipoles in the coating material.

The dispersing agent is an organic, monomeric and/or polymeric substance. The dispersing agent allows for easier dispersion and therefore an even distribution of the binding agent, including insulator particles in the base material.

The coating material in its preferred composition contains a thixotropy agent. This thixotropy agent ensures that the coating material displays a viscous consistency i.e. is easily spreadable when applied to a radiation surface, but is sufficiently viscous when at rest such that no drops or tears can form on the surface. In this way the coating material can be applied to a radiation surface and will follow its outline exactly.

The coating material in its preferred composition is applied to a radiation surface of an emitter with which electromagnetic radiation can be emitted of a frequency in the same order of magnitude as the natural molecular frequency of the material placed in the emission field of the emitter in order to be heated or cooled. This emitter has a large surface area and is limited by two supply lines laid out in parallel and having a separation distance corresponding to an integral multiple of the wave length emitted by the emitter. This emitter can emit a frequency both in the range of the natural molecular frequency of the material to be heated or cooled as well as a correspondingly suitable frequency for a liquid or gaseous medium also located in the room. In this way the medium can be included into the temperature change process. A high efficiency is achieved on account of the mutual interaction of the emitter with the material to be heated or warmed, in the range of its frequency of resonance with the natural molecular frequencies. The coating material with its large number of dipoles, contributes to produce an overall effective emission system for electromagnetic waves having a high emission level.

In the first process step in the preparation of the binding agent 64 to 79% mole fraction distilled water, 4 to 6% mole fraction sulfated oil, 0.16 to 0.24% mole fraction phenols or 0.05 to 0.5% mole fraction benzoisothiazolinon, 15 to 19% mole fraction casein, 0.8 to 1.2% mole fraction urea, 2 to 3% mole fraction alkali diluent and 2.5 to 3.5% mole fraction caprolactam are mixed together.

In the second process step to prepare the base material 39 to 49% mole fraction of the binding agent prepared in the first process step, 18 to 23% mole fraction insulating agent, 18 to 24% mole fraction dispersing agent and 12 to 16% mole fraction distilled water are mixed together.

Subsequently, in a third process step to prepare the coating material, 55 to 65% mole fraction of this base substance and 35 to 45% mole fraction graphite are mixed together, where the insulating agent, the graphite and the binding agent lead to the formation of a large number of electric dipoles for the emission of electromagnetic waves.

These substances are mixed in the individual process steps using either mixing and/or kneading apparatus, such as a screw mixer, mixing mill or centrifugal mixer, all of which guarantee particularly intensive mixing. At the same time these mixers also reduce the size of the particles added, in particular the insulator particles added in the second process step and the graphite particles added in the third process step. These particles are thereby finely, and above all, evenly distributed in the coating material and form a large number of microscopic electric dipoles for the generation of electromagnetic waves with a high emission level. In this manner the coating material can be prepared easily and thus also cost effectively.

In the preparation process in its preferred form, sulfated ricinus oil is the preferred sulfated oil used in the binding agent because it is well suited, in particular on account of its interface-active properties. The phenols of preference used in the binding agent are carbonized phenols produced by cracking or benzoisothiazolinon. Furthermore, in the preferred preparation process a solvent based on aromatics and/or alcohol and/or ester and/or ketone is used as diluent in the binding agent. An insulating soot is used as the preferred insulating agent in the base material and it is advantageous to add it in the milled state with a very small particle size. This promotes an even distribution of the soot in the base material and the overall formation of a large number of electrical dipoles in the coating material.

Furthermore, an inorganic and/or organic, monomeric and/or polymeric substance is used as dispersing agent to facilitate an even distribution of the binding agent including the insulator particles in the base material.

A thixotropy agent is also mixed into the coating material. This thixotropy agent ensures that the coating material is easily spreadable when applied to a radiation surface, but is sufficiently viscous when at rest such that no drops or tears can form on the surface.

The prepared spreadable coating material is applied to the radiation surface of an emitter by means of spraying, painting or knife coating process and dried there. The quantity applied is selected so that a dry layer of, for example, 60 to 80 micrometer layer thickness is formed. The emitter can then be used to emit electromagnetic radiation with a frequency in the same order of magnitude as the natural molecular frequency of the material placed in the emission field of the emitter in order to be heated or warmed.

A preferred composition of the coating material, based on a specific example, will now be detailed:

In the first process step, a binding agent is prepared by mixing 71.4% mole fraction distilled water, 5.0% mole fraction sulfated ricinus oil, 0.2% mole fraction carbonized phenols, produced by cracking, 16.9% mole fraction casein, 1.0% mole fraction urea, 2.5% mole fraction diluent and 3.0% mole fraction caprolactam.

Subsequently, in a second process step, a base material is prepared by mixing 44.2% mole fraction of the binding agent,
20.7% mole fraction of an insulating soot,
21.0% mole fraction of a dispersing agent and
14.1% mole fraction distilled water.

Subsequently, in a third process step, a coating material is prepared by mixing

60% mole fraction of the base material and
40% mole fraction graphite as a pi electron system.

This coating material was applied to the radiation of an emitter, allowed to dry and then a stimulus applied to the emitter. The electromagnetic radiation thus measured exhibited a high degree of radiation.

To prepare the binding agent, the individual components are mixed together in a mixer according to a specific procedure e.g. with 2000 revolutions/min for 10 to 20 minutes. In the second process step mixing is again carried out at e.g. 2000 revolutions/min for 10 to 20 minutes, whereby at the same time pressure at a level of 6 to 28 MPa can be applied to the base material to bring about a reduction in the soot particle sizes to less than 40 micrometers. In the third process step the substances are again mixed at e.g. 2000 revolutions/min for 10 to 20 minutes, whereby additional pressure, applied at intervals, of a magnitude of 6 to 18 Mpa may be applied to the coating material, producing shearing stress that promotes a lengthways orientation of the dipoles in the coating material. To achieve an advantageous dispersion of the individual components the ultrasound dispersion technique can be used as it guarantees a particularly fine distribution of the particles and thus the dipoles.

What is claimed is:

1. A coating material for radiation surfaces that produces electromagnetic waves, said coating material comprising:
    55 to 65% mole fraction of a base material and 35 to 45% mole fraction of graphite, said base material comprising a binding agent, insulating agent, dispersing agent, and distilled water, in the following proportions:
        39 to 49% mole fraction of binding agent,
        18 to 23% mole fraction of insulating agent,
        18 to 24% mole fraction of dispersing agent, and
        12 to 16% mole fraction of distilled water;
    said base material and graphite being combined to form electrical dipoles for the emission of electromagnetic waves.

2. The coating material of claim 1 wherein said binding agent is comprised of the following ingredients:
    64 to 79% mole fraction of distilled water,
    4 to 6% mole fraction of sulfated oil,
    0.16 to 0.24% mole fraction of phenols,
    15 to 19% mole fraction of casein,
    0.8 to 1.2% mole fraction of urea,
    2 to 3% mole fraction of alkali diluent; and,
    2.5 to 3.5% mole fraction of caprolactam.

3. The coating material of claim 2 wherein said sulfated oil is sulfated ricinus oil.

4. The coating material of claim 2 wherein said phenols are carbonized phenols produced by cracking.

5. The coating material of claim 2 wherein said diluent is a solvent based on aromatics, alcohol, ester, and ketone.

6. The coating material of claim 1, wherein said insulating agent is an insulating soot.

7. The coating material of claim 1 wherein said dispersing agent is selected from the group consisting of inorganic, organic, monomeric, and polymeric substances.

8. The coating material of claim 1 wherein said coating material contains a thixotropy agent.

9. The coating material of claim 1 wherein said coating material is applied to a radiation surface of an emitter so that an electromagnetic radiation can be emitted with a frequency in the same order of magnitude as the natural molecular frequence of a material subjected to the electromagnetic radiation to be emitted from the emitter; and wherein said material subjected to the electromagnetic radiation emitted from the emitter is thereby heated or cooled.

10. A process for manufacturing a coating material for radiation surfaces that produce electromagnetic waves, said coating material including a binding agent, insulating agent, dispersing agent, water, and graphite mixed together, the process of forming the coating material comprises:
    a first step to prepare said binding agent by mixing together
        64 to 79% mole fraction of distilled water;
        4 to 6% mole fraction of sulfated oil,
        0.16 to 0.24% mole fraction of phenols or
        0.05 to 0.5% mole fraction benzoiothiazolinon,
        15 to 19% mole fraction of casein,
        0.8 to 1.2% mole fraction of urea,
        2 to 3% mole fraction of alkali diluent; and,
        2.5% to 3.5% mole fraction of caprolactam;
    a second step to prepare the base material by mixing together
        39 to 49% mole fraction of binding agent,
        18 to 23% mole fraction of insulating agent,
        18 to 24% mole fraction of dispersing agent; and,
        12 to 16% mole fraction of distilled water;
    and a third step to prepare the coating material by mixing together
        55 to 65% mole fraction of a base material, and
        35 to 45% mole fraction of graphite;
    and, wherein said insulating agent, graphite, and binding agent form electrical dipoles for the emission of electromagnetic waves.

11. The process of claim 10 wherein said coating material is applied to the radiation surface of an emitter by spraying, painting or knife coating process, drying said coating to harden same, whereby the emitter will emit an electromagnetic radiation with a frequency in the same order of magnitude as the natural molecular frequency of a material subjected to the electromagnetic radiation to be emitted from the emitter; and wherein said material to be subjected to the electromagnetic radiation emitted from the emitter is thereby heated or cooled.

* * * * *